/

US007761921B2

(12) United States Patent
Gannon et al.

(10) Patent No.: US 7,761,921 B2
(45) Date of Patent: Jul. 20, 2010

(54) METHOD AND SYSTEM OF ENABLING A SOFTWARE OPTION ON A REMOTE MACHINE

(75) Inventors: Julie A. Gannon, Washington, IL (US); Steven W. O'Neal, Bartonville, IL (US); April D. Scott, Dunlap, IL (US); Vernon R. Smith, Peoria, IL (US); Kenneth L. Stratton, Dunlap, IL (US)

(73) Assignee: Caterpillar Inc, Peoria, IL (US)

( * ) Notice: Subject to any disclaimer, the term of this patent is extended or adjusted under 35 U.S.C. 154(b) by 882 days.

(21) Appl. No.: 10/699,125

(22) Filed: Oct. 31, 2003

(65) Prior Publication Data

US 2005/0107898 A1     May 19, 2005

(51) Int. Cl.
    *G06F 7/04*     (2006.01)
    *G06F 17/30*     (2006.01)
    *H04N 7/16*     (2006.01)

(52) U.S. Cl. .......................................... 726/26; 700/90
(58) Field of Classification Search .................. 726/26, 726/33; 700/90
See application file for complete search history.

(56) References Cited

U.S. PATENT DOCUMENTS

| | | | | |
|---|---|---|---|---|
| 5,018,079 A | * | 5/1991 | Shukunami et al. | 358/1.6 |
| 5,077,660 A | * | 12/1991 | Haines et al. | 705/410 |
| 5,107,455 A | * | 4/1992 | Haines et al. | 710/8 |
| 5,260,999 A | * | 11/1993 | Wyman | 705/59 |
| 5,293,500 A | * | 3/1994 | Ishida et al. | 712/217 |
| 5,715,390 A | * | 2/1998 | Hoffman et al. | 726/20 |
| 5,761,518 A | * | 6/1998 | Boehling et al. | 710/1 |
| 5,790,664 A | * | 8/1998 | Coley et al. | 709/203 |
| 5,822,415 A | * | 10/1998 | Gordon | 379/140 |
| 5,832,264 A | * | 11/1998 | Hart et al. | 719/316 |
| 5,838,894 A | * | 11/1998 | Horst | 714/11 |
| 5,918,051 A | * | 6/1999 | Savitzky et al. | 719/315 |
| 5,933,497 A | * | 8/1999 | Beetcher et al. | 705/59 |
| 5,987,135 A | * | 11/1999 | Johnson et al. | 709/224 |
| 6,067,582 A | * | 5/2000 | Smith et al. | 710/5 |
| 6,073,124 A | * | 6/2000 | Krishnan et al. | 705/59 |
| 6,223,030 B1 | * | 4/2001 | Van Den Heuvel et al. | 455/435.2 |
| 6,260,076 B1 | * | 7/2001 | Savitzky et al. | 719/315 |

(Continued)

FOREIGN PATENT DOCUMENTS

EP     0704785 A2     4/1996

(Continued)

OTHER PUBLICATIONS

Marc A Kaplan: "IBM Cryptolopes, SuperDistributions & Digital Rights Management" of Dec. 30, 1996 IBM Research XP002132994 whole document.

(Continued)

*Primary Examiner*—David García Cervetti
*Assistant Examiner*—Nasser Moazzmi
(74) *Attorney, Agent, or Firm*—W. Bryan McPherson (57) ABSTRACT

The present disclosure is associated with a user requesting access to the software option associated with a machine, a remote facility receiving the request, authorizing access to the software option, and sending an enabling signal to enable the software. The enabling signal (e.g., a software key) may then be used to access and use the software option. An intermediary may be used to authenticate the enabling signal.

51 Claims, 2 Drawing Sheets

U.S. PATENT DOCUMENTS

| | | | |
|---|---|---|---|
| 6,385,494 B1* | 5/2002 | Blahnik et al. | 700/86 |
| 6,396,849 B1* | 5/2002 | Sarkissian et al. | 370/490 |
| 6,438,617 B1* | 8/2002 | Savitzky et al. | 719/316 |
| 6,557,105 B1* | 4/2003 | Tardo et al. | 713/193 |
| 6,560,222 B1* | 5/2003 | Pounds et al. | 370/353 |
| 6,765,593 B2* | 7/2004 | Simmons | 715/763 |
| 6,829,704 B2 | 12/2004 | Zhang et al. | 713/1 |
| 6,964,051 B1* | 11/2005 | Palaniappan | 719/317 |
| 6,966,000 B2* | 11/2005 | Zhang et al. | 726/22 |
| 6,983,375 B2* | 1/2006 | Zhang et al. | 726/35 |
| 6,990,434 B2* | 1/2006 | Minogue et al. | 702/188 |
| 6,996,544 B2* | 2/2006 | Sellars et al. | 705/51 |
| 7,013,004 B1* | 3/2006 | Edwards | 379/219 |
| 7,035,932 B1* | 4/2006 | Dowling | 709/230 |
| 7,055,040 B2* | 5/2006 | Klemba et al. | 713/156 |
| 7,073,633 B2* | 7/2006 | Weinberger et al. | 187/393 |
| 7,093,032 B2* | 8/2006 | Minogue et al. | 710/8 |
| 7,113,894 B2* | 9/2006 | Minogue et al. | 702/188 |
| 7,133,850 B2* | 11/2006 | Gargiulo | 705/402 |
| 7,146,340 B1* | 12/2006 | Musson | 705/57 |
| 7,155,415 B2* | 12/2006 | Russell et al. | 705/59 |
| 7,181,543 B2* | 2/2007 | King et al. | 709/250 |
| 7,197,633 B2* | 3/2007 | Rommelmann et al. | 713/1 |
| 7,219,222 B1* | 5/2007 | Durbin et al. | 713/100 |
| 7,231,360 B2* | 6/2007 | Sy | 705/29 |
| 7,260,557 B2* | 8/2007 | Chavez | 705/59 |
| 7,290,047 B2* | 10/2007 | Yamamoto et al. | 709/223 |
| 7,321,966 B2* | 1/2008 | Koontz et al. | 713/1 |
| 7,334,261 B2* | 2/2008 | Koontz et al. | 726/17 |
| 7,359,882 B2* | 4/2008 | Eng | 705/59 |
| 7,389,341 B2* | 6/2008 | Cornelius et al. | 709/224 |
| 7,421,516 B2* | 9/2008 | Minogue et al. | 710/8 |
| 2001/0011253 A1* | 8/2001 | Coley et al. | 705/59 |
| 2002/0004785 A1* | 1/2002 | Schull | 705/51 |
| 2002/0067833 A1 | 6/2002 | Han et al. | |
| 2002/0096565 A1 | 7/2002 | Ogram | |
| 2002/0120578 A1* | 8/2002 | Sy | 705/59 |
| 2002/0152395 A1* | 10/2002 | Zhang et al. | 713/200 |
| 2002/0152400 A1* | 10/2002 | Zhang et al. | 713/201 |
| 2002/0152401 A1* | 10/2002 | Zhang et al. | 713/201 |
| 2002/0161718 A1* | 10/2002 | Coley et al. | 705/59 |
| 2002/0161990 A1* | 10/2002 | Zhang et al. | 713/1 |
| 2002/0165945 A1 | 11/2002 | Buswell et al. | |
| 2002/0169725 A1* | 11/2002 | Eng | 705/59 |
| 2003/0018491 A1* | 1/2003 | Nakahara et al. | 705/1 |
| 2003/0023427 A1* | 1/2003 | Cassin et al. | 704/201 |
| 2003/0030990 A1* | 2/2003 | King et al. | 361/724 |
| 2003/0033348 A1* | 2/2003 | King et al. | 709/201 |
| 2003/0149670 A1* | 8/2003 | Cronce | 705/59 |
| 2003/0149671 A1* | 8/2003 | Yamamoto et al. | 705/59 |
| 2003/0156719 A1* | 8/2003 | Cronce | 380/256 |
| 2003/0177224 A1* | 9/2003 | Nguyen | 709/224 |
| 2003/0187799 A1* | 10/2003 | Sellars et al. | 705/51 |
| 2003/0227643 A1* | 12/2003 | Reddy et al. | 358/1.13 |
| 2004/0006542 A1* | 1/2004 | Gilliam et al. | 705/51 |
| 2004/0015857 A1* | 1/2004 | Cornelius et al. | 717/120 |
| 2004/0088176 A1* | 5/2004 | Rajamani | 705/1 |
| 2004/0094366 A1* | 5/2004 | Weinberger et al. | 187/247 |
| 2004/0098348 A1* | 5/2004 | Kawasaki et al. | 705/59 |
| 2004/0103011 A1* | 5/2004 | Hatano et al. | 705/4 |
| 2004/0117483 A1* | 6/2004 | Singer et al. | 709/225 |
| 2004/0172367 A1* | 9/2004 | Chavez | 705/59 |
| 2004/0205811 A1* | 10/2004 | Grandy et al. | 725/28 |
| 2004/0240904 A1* | 12/2004 | Koontz et al. | 399/75 |
| 2005/0010536 A1* | 1/2005 | Cochran et al. | 705/76 |
| 2005/0028100 A1* | 2/2005 | Rommelmann et al. | 715/705 |
| 2005/0038751 A1* | 2/2005 | Gaetano | 705/59 |
| 2005/0049973 A1* | 3/2005 | Read et al. | 705/59 |
| 2005/0050185 A1* | 3/2005 | King et al. | 709/223 |
| 2005/0090731 A1* | 4/2005 | Minogue et al. | 600/407 |
| 2005/0091422 A1* | 4/2005 | Minogue et al. | 710/8 |
| 2005/0108566 A1* | 5/2005 | Minogue et al. | 713/201 |
| 2005/0223374 A1* | 10/2005 | Wishart et al. | 717/173 |
| 2005/0229259 A1* | 10/2005 | Peeters et al. | 726/32 |
| 2005/0251489 A1* | 11/2005 | Coley et al. | 705/59 |
| 2005/0278149 A1* | 12/2005 | Minogue et al. | 702/188 |
| 2006/0004668 A1* | 1/2006 | Hamnen et al. | 705/59 |
| 2006/0106727 A1* | 5/2006 | Yellai et al. | 705/59 |
| 2006/0106732 A1* | 5/2006 | Coley et al. | 705/59 |
| 2006/0106733 A1* | 5/2006 | Coley et al. | 705/59 |
| 2006/0112194 A1* | 5/2006 | Minogue et al. | 710/8 |
| 2006/0173794 A1* | 8/2006 | Sellars et al. | 705/76 |
| 2007/0050301 A1* | 3/2007 | Johnson | 705/59 |
| 2007/0086372 A1* | 4/2007 | Lee et al. | 370/328 |
| 2007/0107067 A1* | 5/2007 | Fountian | 726/33 |
| 2007/0150418 A1* | 6/2007 | Ben-Menahem et al. | 705/59 |

FOREIGN PATENT DOCUMENTS

| | | |
|---|---|---|
| WO | WO 98/42098 | 9/1998 |
| WO | WO 00/08909 | 2/2000 |
| WO | WO 00/67095 | 11/2000 |

OTHER PUBLICATIONS

Marc A Kaplan: "IBM Cryptolopes, SuperDistributions & Digital Rights Management" of Dec. 30, 1996 IBM Research XP002132994.

* cited by examiner

METHOD AND SYSTEM OF ENABLING A SOFTWARE OPTION ON A REMOTE MACHINE

TECHNICAL FIELD

This invention relates generally to a method and system of enabling a software option, and more particularly to a method and system of enabling a pre-loaded software option on a remote machine.

BACKGROUND

In general, functional capabilities associated with hardware platforms and the associated machines continue to increase, in large part due to the advances in software and electronic control of these machines. When a machine, such as an automobile, earth moving machine, or even home electronics systems (e.g., computers and entertainment systems), is purchased there is usually several versions of software that may be sold with the machine. The software is usually sold as an upgrade to the basic system. Traditionally, once a machine has been sold, if the user wanted to purchase additional functionality, e.g., additional software functionality, they needed to physically go to the seller and purchase the desired software. Alternatively, the seller may come to them to install the desired software. Having to purchase after market software, obtain a physical copy of the software and download it to the machine may be a time consuming process and a process that suffers from logistic problems. For example, the user often does not realize there are compatabilty problems with the desired software until the software is purchased, loaded, and won't work properly. Some systems, such as the one disclosed in U.S. Patent Application No. 2002/0152400A1 disclose the ability to pre-load software onto a device when its sold, and then enable user requested functions from a remote location, at a later date. While this is an advancement over previous methods, there are still several issues that exist with enabling software from a remote location, such as security and authorization issues etc.

In addition, when a controller fails on a remote machine, current replacement processes again involve inefficient logistic processes that involve replacing the controller, then attempting to identify what software the controller had, and what software features were enabled etc. Loading the wrong software, or not enabling the appropriate software options may lead to wasted time and frustration when the machine does not operate appropriately.

In addition, some environments, such as a work site, may involve a distributed network of controllers associated with different machines performing different functions. These machines may need access to a particular software option to perform a particular task. However, purchasing rights to the software for each machine may be expensive, especially since not all the machines will need functionality at a given time. Current processes do not address this need.

The present disclosure is directed towards solving one or more of the problems set forth above.

SUMMARY OF THE INVENTION

In one aspect of the present invention, a method of enabling a software option located on a remote machine is disclosed. The method includes the steps of receiving a request to enable the software option, authorizing the enablement, delivering a first enabling signal to an intermediary, and delivering a second enabling signal to the machine in response to the first enabling signal.

In another aspect of the present invention, a method of enabling a software option located on a remote machine is disclosed. The method includes the steps of receiving a request to enable said software option, authorizing the request, delivering an enabling signal to the remote machine, and distributing at least a portion of the enabling signal to a plurality of controllers located on the remote machine.

In another aspect of the present invention, a method of providing an entitlement for an enabled software option located on a remote machine is disclosed. The method includes the steps of receiving a request to disable the software option, disabling the software option, receiving a disabled characteristic associated with the software option, and establishing an entitlement in response to the disabled characteristic.

In anther aspect of the present invention, a method of enabling a software option located on a remote machine is disclosed. The method includes the steps of receiving a request to enable the software option, enabling the software option during a trial period, notifying a user with respect to an expiration of the trial period, receiving a request to enable the software option in response to the notification, authorizing the request, and delivering an enabling signal to the remote machine.

In anther aspect of the present invention, a method of disabling a software option located on a remote machine is disclosed. The method includes the steps of receiving a request to disable said software option, disabling said software option, and receiving a disabled characteristic associated with said software option.

In another aspect of the present invention, a method of enabling a software option located on a remote customer machine is disclosed. The method includes the steps of receiving a request by a manufacturer from a dealer to enable said software option, authorizing said request in response to a dealer characteristic and a machine characteristic, and delivering an enabling signal to said remote machine.

In another aspect of the present invention, a method of enabling a software option located on a remote machine is disclosed. The method includes the steps of establishing a machine specific configuration, generating a request to enable said software option in response to said machine specific configuration, said request being authorized at a remote location, and receiving an enabling signal at said machine in response to said authorization.

In another aspect of the present invention, a method of enabling a software option located on a first machine is disclosed. The method includes the steps of establishing a need for said software option on said first machine, delivering a request for said software option to a second machine. disabling said software option on said second machine in response to said request. generating an enabling signal in response to said disablement, and enabling said software option on said first machine in response to said enabling signal.

In another aspect of the present invention, a system configured to enabling a software option located on a remote machine is disclosed. The system includes a controller located on said remote machine, said controller being configured to generate a request to enable said software option, a remote facility configured to receive said request, authorize said request and generate a first enabling signal, and an intermediary configured to receive said first enabling signal, authenticate said signal, and responsively deliver a second enabling signal to said machine in response to said first enabling signal.

DETAILED DESCRIPTION

The present disclosure includes a system and method of enabling a software option located on a remote machine. The software option may be located on a controller or memory accessible by the controller. The machine may be any type of machine, equipment, or product that includes software associated with one or more controllers to perform one or more functions associated with the machine. Non-limiting examples of machines include engines, boats, earth moving equipment, mobile machines (including automobiles), household computer based machines such as computers, entertainment equipment, appliances, etc. A software option may include one or more software functions, software module, software sub-modules, algorithms etc. The software option located on the remote machine is software that has been pre-loaded onto the machine but not activated. For example, the software may have been pre-loaded onto one or more controllers or memory devices located on the machine. In one embodiment, the software option may be associated with a particular functional feature associated with the machine. The functional feature may be a functional upgrade (or functional capability) that may be leased or purchased after the initial lease or purchase of the machine. For example, in the context of earthmoving equipment, the upgrade may enable more efficient operation of the machine, thereby improving the productivity of the machine. The software may have been loaded onto the machine at the time the machine was initially assembled and sold, or at the time a software update was made to the machine (e.g., an update in software versions).

A controller associated with the present disclosure may include a microprocessor or other computing device. In the context of this disclosure a controller may include associated memory. The memory may be physically co-located on the controller, or a separate memory device located in the machine. For example, a machine may include a plurality of controllers and separate memory devices. The memory devices may include some pre-loaded software options. One controller may be specifically associated with a particular memory device, and the associated software options. Alternatively, a controller may dynamically establish which memory has a desired software option. In either of these context the controller is considered to be associated with the memory device having the software option. Therefore, as will be discussed, a software option may be enabled by delivering a enabling signal (e.g., software key to the controller). This may be performed by delivering an enabling signal to the controller and/or memory device associated with the software option. If the enabling signal is delivered to the controller, the controller may establish whether the software option is located locally on the controller, or on a separate memory device, and then enable the software option accordingly. For the purpose of this disclosure, the process will simply be referred to as enabling the software option by delivering an enabling signal to the controller.

In one embodiment, the present disclosure is associated with a user requesting access to the software option associated with a machine at a remote location, a dealer and/or manufacturer receiving the request, authorizing access to the software option, and sending an enabling signal to enable the software. The enabling signal (e.g., a software key) may then be used to access and use the software option. A request to access software refers to a request to utilize the function provided by the software. The request may be a request to purchase the software. Alternatively the request may be to license the software for a period of time.

Figure 1:
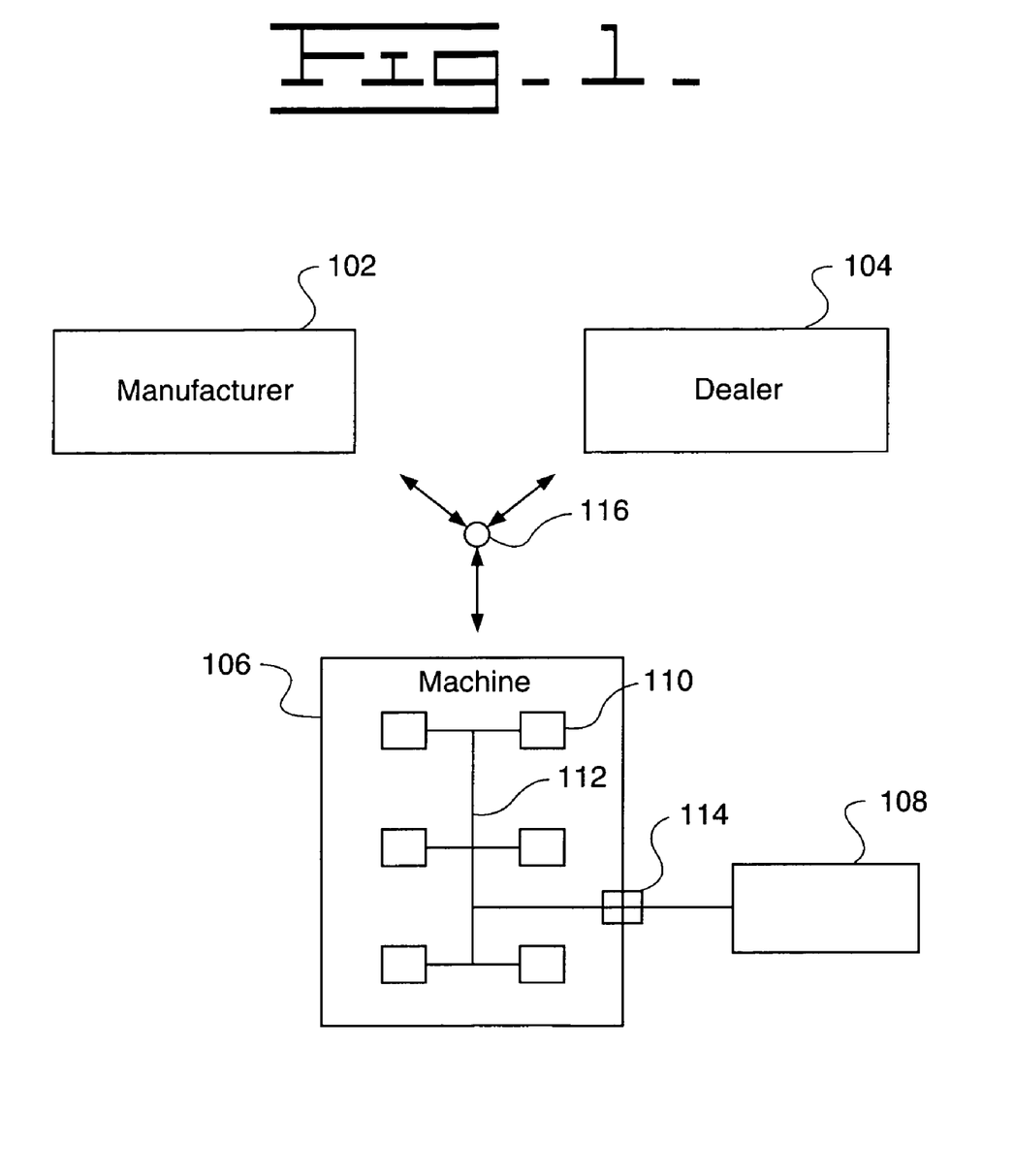
FIG. 1 illustrates one embodiment of an environment associated with the present invention.

A mobile machine will be used as a non-limiting example for the purpose of describing the present invention. FIG. 1 illustrates one embodiment of an environment associated with present invention. The environment includes a manufacturer 102, a dealer 104 and a mobile machine 106. The mobile machine may have a network 112 that connects one or more electronic controllers and memory devices 110. The network 112 may include a network gateway 114. A gateway 114, or gateway network 114, is a device that may act as an intermediary between external communications and an internal controller or network of controllers. In one embodiment, a dealer 104 (e.g., dealer technician) may use a service computer 108 to interact with one or more of the controllers 110 by connecting directly or indirectly to the network 112. The service computer 108 may be able to communicate wirelessly with the manufacturer 102 or dealer facility 104. Web access may also be available from the manufacturer 102 and/or dealer 104. The mobile machine 106 may also include a user interface (not shown) that is able to communicate with one or more of the controllers 110. The user interface may include a keypad, keyboard, touch screen display or other form of device capable of receiving user information. In addition, the mobile machine 106 may include the ability to communicate wirelessly with either the manufacturer, dealer, another machine, and/or a user data facility (e.g., a site management office). The environment may also include one or more communication networks 116 enabling the manufacturer, dealer, machine, and/or user to communicate. The network may include a wireless network and/or physical network.

Figure 2:
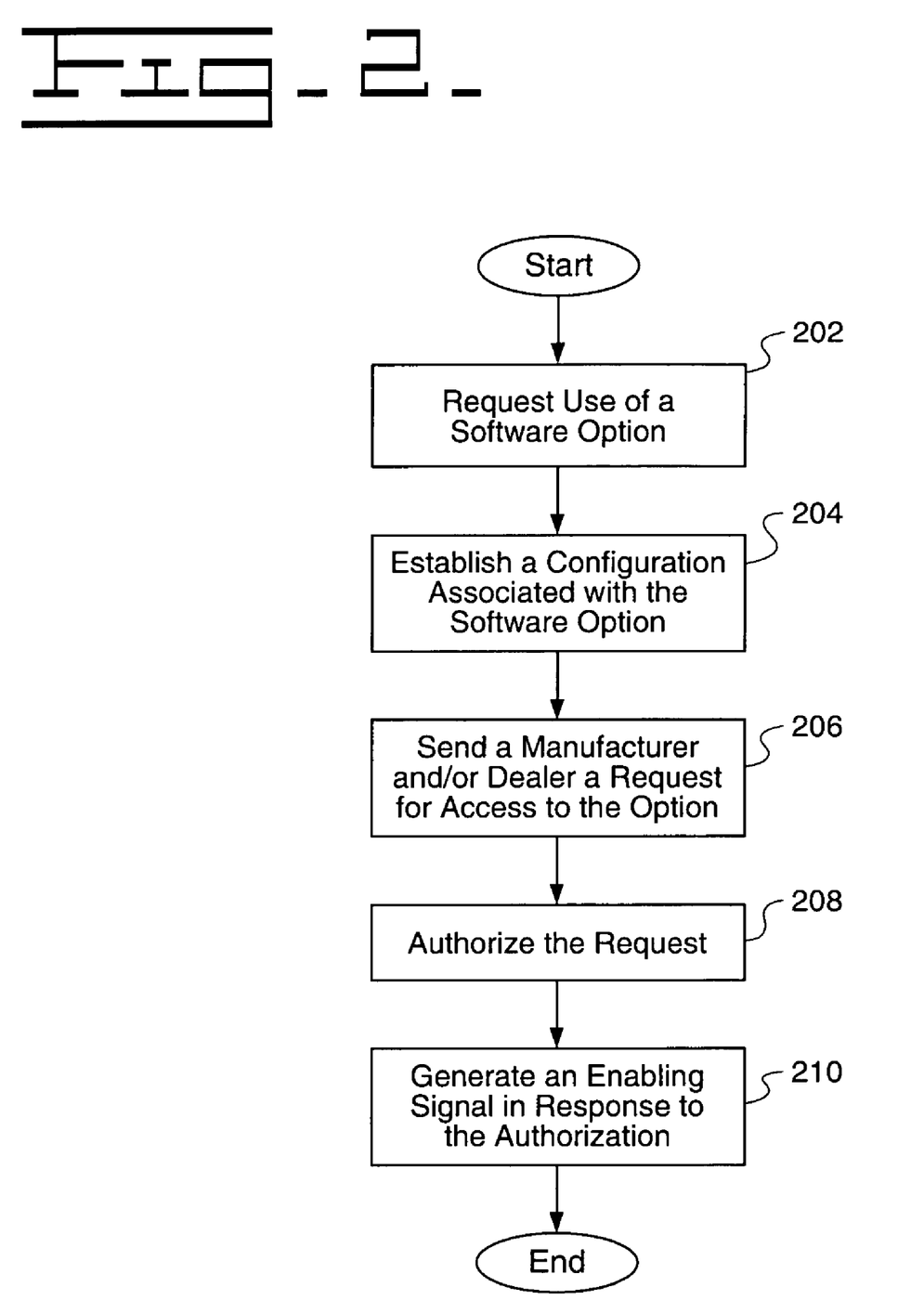
FIG. 2 illustrates one embodiment of a method associated with the present invention.

Embodiments of the present invention may be semi-automated or fully automated. FIG. 2 illustrates one embodiment of the method associated with the present disclosure. Each of the following steps is not required to practice the present disclosure. In a first control block 202, a user may request to use a software option. The user may include a machine owner, machine manager, a machine operator, and/or the machine itself (e.g., a controller on the machine with or without human authorization). The user may request access to a specific software option or may request access to a functional capability, of which a particular software option may be associated. The user may deliver this request to either a dealer 104 associated with the machine or a manufacturer 102 associated with the machine and/or dealer. The user may deliver this request orally, through physical ordering forms, electronically, e.g., through e-mail or through accessing a web site that illustrates available software options or functional capabilities associated with the machine. For example, the user may access a web site illustrating all functionality associated with a particular machine type or machine configuration. Alternatively the web site may illustrate all of the functionality associated with the particular machine being used. The user may select from a list of available options, which software option is desired.

In a second control block 204, a configuration is established associated with the particular machine or a portion thereof. For example, in one embodiment, a dealer may access the machine to determine a configuration of the machine. The configuration information will include information associated with one or more of the controllers and/or associated pre-loaded software. Hardware and software configurations of machines may vary from one machine to the next for a variety of reasons. Therefore, the dealer will determine what configuration this specific machine has. Depending on the type of machine involved, the dealer (e.g., a dealer technician) may access the machine using a service computer 108. The service computer 108 may be connected to the machine 106, thereby connecting the service computer 108 either directly to a controller 110 on the machine 106, or a gateway and/or network 112 that is connected to one or more controllers 110. The service computer 108 may be used to interact with the machine network 112 to establish the current hardware and/or software configuration of the machine 106. The machine configuration may also be obtained from a manufacturer or dealer maintained configuration database. In one embodiment, the current configuration of the machine 106 may be compared to the requested software option or feature. The comparison may be performed to determine if the requested option is compatible with the current configuration, and if so, what software or hardware would be needed to implement the software option. If the comparison indicates that the current configuration is not compatible with the requested option, then a determination may be made regarding what changes, if any, may be made that would enable the requested option to be compatible. For example, is the requested option at odds with another option/feature currently being used, do the software options on the machine support the requested option (e.g., interaction), is the hardware compatible with the requested feature. It may be determined that in order to enable the requested software, additional hardware may be needed. These hardware needs may be identified and requested at the same time the software option is requested (e.g., during the process of identifying the configuration).

In an alternative embodiment, a specific software configuration is established based on the pre-loaded software and presented to the user. The user, or a dealer assisting the user, may generate the user request based on the specific software configuration (e.g., the user selecting directly from the list of confirmed available options). Therefore, a user may request a software option and then the request is compared with a machine configuration. Alternatively, a machine configuration may be established and used by the user to establish the user request.

In a third control block 206, a request for the software option may be delivered to a manufacturer and/or dealer based on the configuration and user request. For example, once the configuration has been determined and compared to the user request, the dealer as used in this embodiment may refine the request if needed (e.g., to identify the specific software options needed and hardware options if necessary, to implement the request), and then deliver the request, or a modified request to the manufacturer 102. In one embodiment, the dealer generated request may include a dealer characteristic and a machine characteristic. A dealer characteristic may include an identifier that the manufacturer may use to confirm the authenticity of the request and/or to track the request for internal processing (e.g., record keeping and/or billing etc.). Examples of identifiers may include a dealer identifier (e.g., an identification number), a dealer technician identifier, an identifier of the service computer used to interact with the customer's machine etc. The machine characteristic may include an identifier that the manufacturer may use to confirm the authenticity of the request and/or track the request for internal processing as indicated above (e.g., to maintain an internal record of the machine configuration and associated active components, for billing purposes etc.). Machine characteristics may include one or more of: a machine serial number, a serial number from one or more of the electronic controllers located on the machine, a user identification number etc. The request may also include the identifier(s) associated with the requested software option(s). The interaction between the dealer and manufacturer (e.g., to deliver the request) may occur electronically, e.g., web based interaction, wireless communication, etc. In one embodiment, the dealer technician may access a web based application and enter the needed information. The entered information may then be submitted to the manufacturer for processing.

The manufacturer then receives the request and associated dealer and machine characteristics. The manufacturer may then authorize the request (control block 208), generate an enabling signal such as a software key (control block 210), and generate billing information associated with the enabled software options. The enabling signal may be sent to the dealer (e.g., dealer technician) and the dealer may then deliver the enabling signal, or a portion thereof, to the machine through the service computer, thereby enabling the software option. Alternatively, the manufacturer may deliver the signal directly to the machine, as will be discussed below. In one embodiment the dealer (e.g., via the service computer) will authenticate the enabling signal prior to delivering it to the machine. For example, the dealer will validate the source of the enabling signal before passing the signal on. The enabling signal may include a re-useable password or software key, a one time use software key, or a software key associated with the type of machine, an expiring software key, etc.

In one embodiment, the enabling signal may be delivered to a specific controller 110, if there is more than one, on the machine. For example, the enabling signal may be delivered to a master controller located on a network 112, or the controller on which the software option is resident or associated with. If the enabling signal is delivered to a master controller, the master controller may then deliver a signal to the controller associated with the software option thereby enabling the option. The controller may use the enabling signal to enable the software option. The master controller may also deliver the enabling signal to additional controllers informing them of the enablement of the software option. Alternatively, additional controllers may request the enabling signal/information from the master controller. In one embodiment, the enabled software option, or portions thereof, may be resident on multiple controllers. If there is a primary portion associated with the software option, then the enabling signal may be delivered to the controller associated with the primary option, and this controller may then deliver a second enabling signal to the other controllers associated with the software option, thereby enabling the software option. Alternatively, the enabling signal may be broadcast on the machine network, and any controller associated with the software option may receive the signal and thereby enable the portion of the software option located on that controller. Therefore, an enabling signal is received by one or more controllers. If one controller is configured to receive the enabling signal and then notify other controllers respectively, the controller may simply pass the received enabling signal on. Alternatively, the controller may modify the enabling signal, or generate a second, different, signal based on the received enabling signal. The modified or second signal may then be broadcast to the other appropriate controllers.

In one embodiment, the enabling signal generated by the manufacturer (a first enabling signal) is received by an intermediary and authenticated. The function of the intermediary includes verifying that the enabling signal is a legitimate signal generated by an authorized source. If the authentication is successful, then a second enabling signal is passed on from the intermediary to the controller, associated with the requested software option (either directly or through the network). The second enabling signal may be the same as the first enabling signal. That is, once authenticated, the intermediary may simply pass the first enabling signal on to the appropriate controller. Alternatively, the intermediary may add or delete information to the enabling signal, or transform the signal and then pass it on, thereby passing on a second enabling signal to the controller. Examples of intermediaries include the dealer technician and/or service computer that may receive the information from the manufacturer and/or dealer and authenticate the information prior to passing it on to the controller. Alternatively, or in addition, the intermediary may be a gateway network. The gateway network may receive the enabling signal and authenticate it before sending a second enabling signal to the appropriate controller, or placing it on the network. Authentication of the enabling device may include confirming the source of the signal is an authorized source. For example, the enabling signal may include a manufacturer and/or dealer identifier. The identifier may be confirmed by the service computer or gateway network before passing the enabling signal on. This authentication process provides additional security measure to the process of enabling software options.

In one embodiment, the process of enabling a software option includes the use of a wireless communication network such that on-site interaction with the machine by the dealer and/or manufacturer is not necessary. For example, a user of the machine may access a machine user interface (not shown) and request the current configuration of the software on the machine. One or more controllers may respond with the available software functions of the machine, including available software options and associated status, e.g., enabled or disabled etc. The user may select an option they desire to enable from the configuration list provided. For example, the user may enter an identifier associated with the software option into the user interface. A controller on the machine may receive the requested user selection from the user interface. The controller may then formulate a request for the software option and transmit the request to a facility such as a central data facility associated with the manufacturer, dealer, and/or user. The request may be transmitted through a wireless communication network such as cellular network, satellite based network, radio transmission network, or other form of wireless communication network. The central data facility may be a facility located with the work site, e.g., at a mine site, construction site etc. The data facility may be a remote facility such as a manufacturer, dealer facility, or other form of user facility. The request (e.g., a request signal) may include a machine characteristic, e.g., user identification characteristic, machine identifier, and/or controller identifier, as described above. The request signal may also include a dealer characteristic such as the dealer associated with the particular machine. The request may then be delivered to a manufacturer and/or dealer facility. The information contained in the request signal, or an associated signal from the machine/user, may be used to authenticate the user request, authorize one or more passwords, and/or for internal processing and billing.

The data facility may then generate an enabling signal that is delivered to the controller associated with the requested software option for the purpose of enabling the software option. The enabling signal is delivered to the controller from the data facility through the wireless network, and the machine interface e.g., network 112. As mentioned above, if an intermediary is used, then the enabling signal may be received by a gateway network, for example, authenticated, and then passed on to the controllers.

In one embodiment of the present invention, during the course of operation an electronic controller 110 may fail, thereby necessitating replacement. If the failure is not a complete failure, configuration information associated with the controller 110 may be accessed to determine what the configuration of the failed controller 110 was, e.g., what software options were on the controller, what versions they were, which of the software options were enabled, what was the date of enablement, who authorized the enablement, what the enabled software options passwords were, etc. The configuration information may be obtained through interaction with the failed controller. Alternatively the information may be obtained from another controller on the machine, from a service tool, or from a remote data base storing configuration information through wireless interaction. For example, there may be a central source for the configuration information, or multiple distributed sources each containing a portion of the configuration implementation associated with the machine. The configuration information, or a portion thereof, may be used to appropriately configure a replacement controller for the machine 106. For example, a dealer technician may connect a service computer 108 to the machine 106 and access the configuration information from the failed controller, or another controller on the network. The dealer technician may then replace the failed controller with another controller that has been pre-loaded with the software located on the failed controller. Alternatively, a blank controller may be inserted into the location previously occupied by the failed controller, and the software to be loaded may be flashed onto the replacement, or downloaded from a remote location (e.g., through a wireless link etc.). The dealer technician may then forward the configuration information, or a portion thereof, to the manufacturer to authorize the enablement of the appropriate software options located on the replacement controller and generate a new enabling signal accordingly. One enablement signal may be used to authorize one or more software options. For example, the dealer technician may generate a signal that includes one or more dealer characteristics and a machine characteristic, where the machine characteristic further includes a failed controller characteristic and a replacement controller characteristic. The failed controller characteristic may include a serial number of the failed controller, failure characteristics associated with the cause of failure, passwords associated with the enabled software etc. The manufacturer may use this information to confirm that the controller failed, that the failed controller did have a particular software option enabled and/or that the software option was indeed disabled and/or uninstalled. The replacement controller characteristic may include a serial number associated with the replacement controller. The serial number of the failed and/or replacement controllers may be cross correlated with the dealer authorized to use the controller in order to confirm the appropriate dealer is using an appropriate replacement controller. Based on this information, the manufacturer may generate an enabling signal that will enable the software options associated with the replacement controller.

In one embodiment, when a controller 110 fails, configuration information may not be obtainable from the machine. Perhaps only the controller serial number is ascertainable, either through a separate database, electronically assessable from the controller, or manually assessable through visual inspection. Therefore, the serial number for the failed controller and/or the replacement controller may be delivered to the manufacturer 102. The manufacturer may then access a database of machine configurations. The database may include information including controller serial numbers and associated information such as: the software associated with the controller, version of the software, the enabled software options associated with the controller, the passwords associated with the enabled software options, the user associated with the controller, the dealer, associated dealer technicians and service computers that may be associated with the software option etc. Based on this information, the manufacturer may establish the configuration of the failed controller, the upgrade software options that had been enabled, and then generate an enabling signal for the replacement controller accordingly. The enabling signal may be based on the prior enabling information (e.g., passwords) that were associated with the failed controller, or may include new enabling information (e.g., passwords). If a new controller is not available, or a major portion of the machine has been disabled, the user may be provided with a credit or entitlement for the software options associated with the failed controller, as will be discussed below.

In an alternative embodiment, when a controller is placed into a network, e.g., into a machine, the controller (or other controllers on the network), may recognize that the controller is new to the environment. Therefore, the controller (or another controller on the network) may generate a notification signal to a remote facility. The notification signal may include identifiers associated with the replacement controller and the failed controller (if available). In one embodiment, the controller may be an upgrade to the system and, therefore, not associated with a failed controller. The remote facility may then authenticate the notification signal received, and respond accordingly. For example, the remote facility may generate an enabling signal to enable the appropriate software options. In one embodiment, as mentioned, the controller may be an added controller to the machine and may not be associated with a failed controller. For example, the user may have ordered a hardware upgrade associated with the machine. When the new controller is installed, it may send a notification signal to the remote facility. The remote facility may use information associated with the users ordered upgrade to determine what software options should be enabled. Based on this information, the remote facility may generate an enabling signal to be delivered to the machine (e.g., to the new controller).

In one embodiment, a user may request to disable a software option and receive an associated credit or entitlement for use at a later time. For example, a user may sell a particular machine having a software option that they have paid for and that has been enabled, or a machine may be taken down for a period of time for maintenance, and the user would like to transfer the software option (or the use thereof) to another machine. Alternatively, the user may simply want to relocate the software function to another machine. A user may want to disable the software option, receive a credit or entitlement for the option that may be used at a later time for another machine. Therefore, the user may request to disable a particular software option (or software feature). The request may be delivered to the dealer and/or manufacturer. In one embodiment, the dealer may interact with the machine to disable the software option. The interaction may include delivering a disable signal to the controller. For example, a disable signal may be delivered from a service computer 108 or wirelessly from a remote facility to the controller(s) 110 on which the software option is resident. The disable signal may cause the controller(s) to disable the software option, and then deliver a disabled characteristic back to the service computer. The disabled characteristic is a characteristic that may be used by the dealer and/or manufacturer to confirm that the software option actually has been disabled. For example, the disable characteristic may be a form of a password associated with the controller and the software option, and/or configuration status indicating the option is disabled. The disable characteristic may be received by the dealer and/or manufacturer and then compared with information associated with the controller and/or software option. The results of the comparison may be used to confirm the software option has been disabled.

Upon confirmation of the software option being disabled, the user may be credited for the future use of the software option. This may be in the form of a credit or entitlement. The credit or entitlement may be specific to the software options disabled, or it may be generic such that it can be applied to other types of software options. Alternatively, the user may be credited some form of prorated refund based on the duration the user had utilized the software option. The user may then request a different controller, on a different machine, be provided access to the software option. The enablement process may transpire as discussed above with the exception that instead of billing the customer upon enablement of the software option, a check is made with respect to whether the user has any associated credits or entitlements that may be used towards the enablement of the requested software. If the user does have a credit or entitlement, then that credit may be used and the dealer and/or user is not charged for access to the software option.

The process of disabling a software option may be performed without the manufacturer or dealer being located with the machine. For example, the user may request to disable the option through a user interface on the machine. The request, and associated information may be delivered to the remote facility through a wireless communication network. The remote facility may then generate a disable signal to the controller, to disable the software option. Upon receipt of the disable signal and actually disabling the software option, the controller may send a confirmation signal to the remote facility. The confirmation signal may include information (such as a disable characteristic) that may be used to confirm the controller was disabled. Upon confirmation, the remote facility may provide the credit/entitlement to the user.

In one embodiment, the software option that is purchased by the user may be used on a rotating basis among multiple machines. That is, the user may purchase access to a particular software option for a particular machine. As machine work functions change in the work environment, access to the software option may be transferred to the particular machine needing to utilize the software option. Therefore, in one embodiment, a controller located on a machine in a work site may recognize the need for a particular software option (or the user may specifically request access to the option). The controller will then attempt to locate the option within the machine, if it has not already. Upon realizing that the software option is not available (e.g., it is loaded, but not enabled), the controller will generate a request for the software option. The request may include identifiers associated with the machine/controller(s) needing the software option. The request may also include a priority characteristic indicative of the priority of the need for the software option. In one embodiment, the generated request will be broadcast to the machines in the work site (or all the machines in a defined group, e.g., those owned by the owner of the requesting machine). The machine having the software option currently enabled will receive the request, and determine if it currently needs the option. If it does still need the option enabled, it may notify the requesting machine that the option is currently in use, and may provide a priority associated with the use (in the event the requestor is involved in a higher priority activity), and/or may provide information associated with when the option will be available. If the machine having the option received a priority in the request, the machine may compare that with the priority of the tasks it is involved in to determine whether to relinquish control of the software option.

If the machine/controller is willing to relinquish control of the software option, e.g., the software option is not being used, or the software option is involved in a task of lower priority than the requesting controller, then the software option (or associated use thereof) may be transferred to the requesting controller. For example, a controller associated with the machine having the software option may disable the software option on that machine. Disabling characteristics associated with disabling the option may be included in a disable signal that may be generated. The disabling characteristics may be included if external tracking of option control is being performed. Enabling characteristics associated with the option may then be sent to the requesting controller, e.g., via an enabling signal. Enabling characteristics may include passwords, software keys etc. that will be used to enable the software option on the requesting machine. The enabling characteristics may be used by the requesting machine/controller when received to enable the particular software option. A confirmation of the software option being enabled may be generated if the information is needed.

In one embodiment, information associated with the relocation of control of the software option across multiple machines may be transferred and tracked by an intermediary, e.g., a remote data facility, a master controller, or an electronic site manager etc. The information may include all or portions of the requesting signal, disable signal, enable signal, and/or confirmation signal. In this manner, control of the software option may be tracked. In addition, the intermediary may use the information to verify that the software option is being enabled/disabled appropriately such that multiple copies of the option are not in use at a given time. That is, the intermediary may confirm that the option is not being used on more machines at a given time than is authorized.

In one embodiment, the intermediary may play a more active role in the process such that all request and control transfers pass through the intermediary. The control transfer may not be allowed to happen unless the intermediary is able to confirm the option has been disabled on the machine on which it was being used. Once verification that the software option has been disabled is obtained, the intermediary may pass the appropriate enabling information on to the requesting controller.

In one embodiment, an intermediary may also include a scheduling function such that when multiple controllers request access to the same software option while the option is in use, the use of the software option is scheduled. For example, a schedule may be created by priorities of the task the requesting controllers are involved in, the duration of the task the requesting controllers are involved in, a first come first serve basis etc. In this manner the use of the software option and associated enabling and disabling of the function is managed across multiple machines. The scheduling function may occur at a central location, facility or controller, or as a distributed process.

In one embodiment, a notification may be provided when a controller and/or a software option is physically relocated to another machine. There are several ways for a controller and/or the associated software to determine whether it has been relocated. For example, a buddy system may be used where one controller exchanges identification information with another controller located on the machine. The identification information may include information such as the serial number of the controller, the software loaded on the controller, the software enabled on the controller, etc. A controller may periodically communicate with another controller on the network, e.g., the buddy controller. For example, on power up of the network the controller may communicate with its buddy controller to determine the status. If the buddy controller is not there, i.e., a different controller responds, or no controller responds, then the polling controller may generate a notification. For example, the controller may notify the operator of the machine that there is an issue with a controller. The notification could indicate there is an issue with the polling controller and/or the buddy controller. Alternatively the controller may notify a remote facility, e.g., the manufacturer or dealer, that there is an issue with a controller. In one embodiment, the controller will take additional steps to determine what the issue is before making any notification. For example, the polling controller may contact an additional source to determine if the polling controller is in a different location, e.g., a different machine, or if the buddy controller is actually the controller missing or failed. The polling controller may then notify a user that it has been relocated, and may also notify the manufacturer and/or dealer to let them know of the relocation. The notification may act as a security measure to ensure that controllers aren't unknowingly scavenged from one machine to another. In addition, if a software option has been paid for on one machine, and is not intended to be relocated to another machine, the notification to the manufacturer and/or dealer will put them on notice that a machine specific software option is being relocated.

Controllers may be intentionally relocated to other machines to attempt to trouble shoot a problem on a machine. Therefore, in one embodiment, the controller will determine that it has been relocated. Then it will determine if the software load it has, including the enabled software options, is compatible with the software located on the machine it has been relocated to. In this embodiment, the controller may only provide a notification if the software is incompatible. If the software is compatible, the controller may not generate any notification. In this manner, additional flexibility is built into the system without involving the manufacturer and/or dealer. Alternatively, a notification may be sent to the user, manufacturer, and/or dealer regarding the fact that the controller has been relocated and whether the controllers loaded software, or enabled software, is compatible with the software on the machine.

In one embodiment, when a controller recognizes it has been relocated to another machine, it will provide a notification to a user, manufacturer, and/or dealer, and then stop functioning unless queried by an authorized entity. For example, the relocated controller may receive a signal, determine who sent the signal and/or whether the sender is authorized to re-enable the controller. In response to the signal being from an authorized source, the controller and/or associated software may start functioning, or interacting, again with the appropriate entities. While several courses of action taken by a controller when relocated have been described, the actual action(s) taken may be established by a manufacturer, dealer, and/or user and programmed accordingly into the controller.

One example of the use of notification upon controller relocation is associated with a ground speed limiter software function. As the name suggest, the objective of the ground speed limiter is to limit the speed of the vehicle. In certain environments, such as earth moving operations, insurance discounts may be provided when machines have these ground speed limiters engaged. However, if a controller having a higher ground speed limit is relocated to a machine intended to have a low ground speed limit, then notification to a user, manufacturer, and/or dealer will assist ensuring compliance with the insurance policy provisions.

In one embodiment, the software options and/or associated software options for machines are stored in one or more repositories or data bases, e.g., a repository located in a central data facility. The repository may include the owner of the machine, the dealer associated with the machine, the serial number of the machine, the serial numbers for the hardware configuration of the machine (e.g., controllers etc.), the software configuration located on the controllers of the machine, an identifier associated with the software options, the status of the software options, and a list of personnel (or personnel identifiers) associated with the users that are authorized to change the status of a software option. The repository may include all of the machines manufactured by the manufacturer, regardless of location throughout the world, and/or may include a list of all the machines associated with a particular dealer. A central data facility that includes a thorough list of all the machines and associated hardware and software configurations will be useful in many environments, including the automotive environment. The information in the repository may be used to ensure compatible configurations when additional software hardware or options are requested for the machine. While the same information may be stored on the controllers and/or machines themselves, having a central repository aids in recreating the software functionality of the machine in the event a controller or other hardware device fails.

In one embodiment, the software (or controllers) on the machine may be capable of recognizing when a software option is needed, but not enabled, and then request the software option on its own. For example, a master controller on the machine network may keep track of the software loaded on the controllers and what software options are enabled or disabled. During operation, when a software option is requested, either directly by an operator, or indirectly by a software routine making a call to the software option and not receiving a reply, the master controller may be notified, e.g., by the requesting controller, when the desired software option is not located, or does not reply to the operational request. The master controller may then establish which software option is needed, determine where the software option is located, and then send a request to the manufacturer and/or dealer to enable the software, along with the appropriate request information (e.g., machine serial number, controller serial number, master controller serial number, software option requested etc.). Alternatively, the function of the master controller with respect to knowing the location of the software throughout the network, may be performed in a distributed manner, such that multiple controllers contain portions of information regarding the current software configuration of the network. In one embodiment, a human user may authorize the request prior to delivering the request to the manufacturer or dealer.

In one embodiment, requesting access to a software option also initiates a billing process. That is, when the manufacturer and/or dealer receives a request and then authorizes access to the requested software option, the manufacturer and/or dealer may store information associated with the event for billing purposes. The information stored may include the appropriate identification information (e.g., serial number of the controller, serial number of the machine, user and/or dealer making the request, etc.), identification information associated with the software option (e.g., software option name/code, time of request, etc.), the cost of the software option etc. The information may be transferred to a billing process. Alternatively, the billing process may simply be notified that the information is available. In one embodiment, a determination may be made prior to interacting with the billing process, regarding whether the user has any credit or entitlement associated with software option, that would offset some or all of the cost of the software option. Alternatively the use of credits and/or entitlements is managed by the billing process. The billing process may then use the information to configure an invoice for the customer, and then send the bill to the customer accordingly. In one embodiment, a manufacturer will bill the dealer associated with the user for the cost of the software option. The dealer will in turn bill the user based on the bill received from the manufacturer.

In one embodiment, the user may desire to lease the software as opposed to purchasing the software. In this case, the signal requesting access to the software option may including desired leasing information, such as the time period access to the software option is desired. In this embodiment, the manufacturer and/or dealer may receive the signal requesting access and track the duration of the lease for billing purposes. When the time period of the lease is expired, the software option may automatically disable itself and/or send a notification signal to the manufacturer and/or dealer informing them that the software option has disabled itself (along with any appropriate disable information). Alternatively, when the time period has expired, the manufacturer and/or dealer may send a disable signal to the controller to disable the software option. Upon disablement, the software option, or associated controller may send a notification signal to the manufacturer and/or dealer indicating the software has been disabled and providing any needed disablement identifiers. In one embodiment, process may be established such that the time period of the lease is left open. The user may then send a termination signal to the manufacturer and/or dealer indicating their desire to terminate access to the software option. The manufacturer and/or dealer may then log the event for the purpose of calculating the duration of use of the software option and the associated billing information. The manufacturer and/or dealer may then send a disable signal to the controller(s) having the software option to disable the software option.

In one embodiment, the software option may be used for a trial period of time. The trial period may begin automatically when the software option is invoked by the user. Alternatively, the trial period may be requested from the manufacturer and/or dealer. The manufacturer and/or dealer may then enable the software option for the trial period. A notification may be provided to the user to inform them that the trial period is in progress and how much more time there is in the trial period. Upon expiration of the trial period, the user may be notified, and if the user has not opted to purchase or lease the software, the software option may be disabled, either automatically, or through interaction with the manufacturer and/or dealer.

In one embodiment, disablement of the software option will not occur until certain machine conditions are met. For example, the option may not be enabled or disabled unless the machine is powering up, or powering down. Alternatively, the option may wait until certain work implements are not in operation, then enable or disable the option. For example, when an work implement is not being moved, a controller may notify the operator that the option is being disabled/enabled and then do so. The controller may lock out the implement until the option is enabled/disabled to prevent inadvertent movement while the option is in use, or the machine is in use. This may be done to avoid unintended response or lack thereof, of the machine during operation.

INDUSTRIAL APPLICABILITY

The present invention is associated with a method and system of enabling a pre-loaded software option located on a remote machine. In one embodiment, a user of the machine may view the current features of the machine, and the available features, or options that have been enabled and those that have not been enabled. The machine may have a network of one or more controllers performing functions associated with the machine. The user may view this information through a display associated with the machine. The user may be operating the machine, or may be at a remote facility. The user may select a desired software option from the available options. For example, the user may make the selection using a touch screen interface, or keypad device. One of the controllers may receive this information and then send a signal to a manufacturing facility, requesting access to the particular software option. The request may be sent through a wireless communication network, such as a cellular network or satellite based network. The request may include information such as the machine serial number, controller serial number associated with the software option, the user of the machine, and the name of identifier of the software option desired. The information may also include the name or identifier of the dealer associated with the machine. The information may also include the location of the machine, from which the dealer associated with the machine may be determined. Dealer information, if needed, may also be determined from the machine and/or controller serial number.

The manufacturer may receive the request and review the information in the request. Upon review of the information, the access request may be authorized. Therefore, the manufacturer may establish one or more software keys or passwords that may be used to enable the requested software option. The manufacturer may generate these passwords upon the request, or may have them pre-stored. The manufacturer may then send an enabling signal to the controller to activate the software option. The enabling signal is received by an intermediary associated with the machine. The intermediary may authenticate the source of the signal to ensure that an authorized entity has generated the signal. Once the intermediary has authenticated the signal, the enabling signal, or another signal based on it, will be delivered to the controller having the software option. If multiple controllers are associated with the software option, then the enabling signal may be delivered to all of them through the network. Alternatively, a primary controller may receive the enabling signal and then distribute another signal based on the enabling signal, to the other controllers thereby enabling the portions of the software option that are located on the other controllers.

Upon enablement of the software options, the user may be notified that the software option is available for use.

Other aspects, objects, and advantages of the present invention can be obtained from a study of the drawings, the disclosure, and the claims.

What is claimed is:

1. A method of enabling a software option located on a remote machine having a machine function associated with the software option, comprising:
   receiving a request, at a remote facility configured to authorize the request, to enable the software option associated with the machine function;
   authorizing the request;
   delivering a first enabling signal, from the remote facility, to an intermediary in response to the authorization; and
   delivering a second enabling signal, from the intermediary, to the remote machine in response to the first enabling signal, the second enabling signal configured to enable the software option.

2. A method, as set forth in claim 1, wherein the intermediary authenticates the first enabling signal.

3. A method, as set forth in claim 2, wherein delivering the second enabling signal further comprises delivering the second enabling signal in response to authenticating the first enabling signal.

4. A method, as set forth in claim 1, further comprising:
   establishing a machine specific configuration; and
   generating the software option request in response to the machine specific configuration.

5. A method, as set forth in claim 4, further comprising delivering the second enabling signal to a controller located on the remote machine.

6. A method, as set forth in claim 4, wherein the request is generated by a software program needing the software option.

7. A method, as set forth in claim 1, wherein delivering the second signal further comprises delivering the second signal to a plurality of controllers located on the remote machine.

8. A method, as set forth in claim 1, further comprising:
   initiating a billing process in response to the authorization.

9. A method, as set forth in claim 8, further comprising:
   determining if one of an entitlement and a credit is available in response to the billing process initiation.

10. A method, as set forth in claim 1, wherein authorizing the enablement further comprises:
    authorizing the enablement in response to an entitlement associated with the software option.

11. A method, as set forth in claim 1, wherein the intermediary is a gateway network.

12. A method, as set forth in claim 1, further comprising generating the request in response to a controller failing.

13. A method, as set forth in claim 12, wherein the request includes a failed controller characteristic and a replacement controller characteristic.

14. A method, as set forth in claim 1, wherein authorizing the enablement further includes authorizing the enablement for a time period.

15. A method, as set forth in claim 1, wherein receiving the request further comprises receiving the request from a dealer associated with the remote machine.

16. A method, as set forth in claim 15, wherein authorizing the enablement further includes authorizing the enablement by a manufacturer associated with the remote machine.

17. A method, as set forth in claim 1, further comprising generating a request to enable the software option by the remote machine.

18. A method, as set forth in claim 17, further comprising disabling the software option on a second machine in response to the enablement authorization.

19. A method, as set forth in claim 18, wherein delivering the first enabling signal further comprises delivering the first enabling signal in response to the disabling of the software option.

20. A method, as set forth in claim 17, further comprising scheduling a delivery of the first enabling signal.

21. A method, as set forth in claim 20, wherein scheduling the delivery further comprises scheduling the delivery in response to a priority of the request.

22. A method, as set forth in claim 21, wherein scheduling the delivery further comprises scheduling the delivery in response to a priority of the request and a priority associated with a current use of the software option.

23. A method, as set forth in claim 17, further comprising delivering a notification to the remote machine, the notification including an indication of when the request may be fulfilled.

24. A method of enabling a software option located on a remote machine having a machine function associated with the software option, comprising:
- receiving a request to enable the software option associated with the machine function;
- authorizing the request;
- delivering an enabling signal to the remote machine, the enabling signal configured to enable the software option; and
- distributing at least a portion of the enabling signal to a plurality of controllers located on the remote machine.

25. A method, as set forth in claim 24, wherein the software option is associated with the plurality of controllers.

26. A method, as set forth in claim 25, wherein delivering an enabling signal to the remote machine further comprises delivering the enabling signal to a primary processor, and further wherein the primary processor delivers a second enabling signal to the at least one other processor.

27. A method of enabling a software option located on a replacement processor of a remote machine having a machine function associated with the software option, comprising:
- identifying a failed processor associated with the replacement processor;
- receiving a request to enable the software option associated with the machine function;
- authorizing the request in response to said identifying of the failed processor; and
- delivering an enabling signal to the replacement processor in response to the authorization, the enabling signal configured to enable the software option.

28. A method, as set forth in claim 27, wherein the request includes at least one of a failed controller identifier and a replacement controller identifier.

29. A method, as set forth in claim 28, wherein authorizing the request includes:
- authenticating the failed controller identifier and the replacement controller identifier, and confirming the requested software option was enabled on the failed controller.

30. A method of providing an entitlement for an enabled software option located on a remote machine having a machine function associated with the software option, comprising:
- receiving, at a remote facility, a request to disable the enabled software option on the remote machine, the software option associated with the machine function;
- disabling the software option on the remote machine;
- receiving a disabled characteristic associated with the software option; and
- establishing an entitlement in response to the disabled characteristic.

31. A method, as set forth in claim 30, wherein the entitlement is associated with the disabled software option.

32. A method, as set forth in claim 30, further comprising authenticating the disabled characteristic.

33. A method, as set forth in claim 30, wherein establishing an entitlement further comprises establishing the entitlement in response to the authentication.

34. A method, as set forth in claim 30, further comprising:
- receiving a request to enable a software option on a second machine; and
- authorizing the request in response to the entitlement.

35. A method, as set forth in claim 30, further comprising:
- authenticating the request in response to a controller characteristic and a software option status; and
- generating a disable signal in response to the authentication.

36. A method, as set forth in claim 35, wherein disabling the software option further comprises disabling the software option in response to the disable signal and a machine status.

37. A method, as set forth in claim 36, wherein the machine status includes one of power up and power down.

38. A method, as set forth in claim 36, wherein the machine status includes an implement status.

39. A method of enabling a software option located on a remote machine having a machine function associated with the software option, comprising:
- receiving a request to enable the software option associated with the machine function of the remote machine;
- enabling the software option on the remote machine during a trial period;
- notifying a user with respect to an expiration of the trial period;
- receiving a second request to enable the software option on the remote machine in response to the notification;
- authorizing the second request; and
- delivering an enabling signal to the remote machine, the enabling signal configured to enable the software option.

40. A method, as set forth in claim 39, further comprising generating a disable signal in response to the trial period expiration.

41. A method, as set forth in claim 40, further comprising disabling the software option in response to the disable signal and a machine status.

42. A method, as set forth in claim 41, wherein the machine status includes one of power up and off.

43. A method of disabling a software option located on a remote machine having a machine function associated with the software option, comprising:
- receiving a request, at a remote facility, to disable the software option associated with the machine function of the remote machine;
- disabling the software option on the remote machine; and
- receiving a disabled characteristic associated with the software option.

44. A method of enabling a software option located on a remote customer machine having a machine function associated with the software option, comprising:
- receiving a request by a manufacturer from a dealer to enable the software option associated with the machine function of the remote customer machine;
- authorizing the request in response to a dealer characteristic and a machine characteristic; and
- delivering an enabling signal to the remote customer machine, the enabling signal configured to enable the software option.

45. A method, as set forth in claim 44, wherein delivering an enabling signal to the remote customer machine further comprises:
- delivering the enabling signal to the dealer in response to the authorization; and
- delivering the enabling signal to the remote customer machine in response to the dealer receipt.

46. A method as set forth in claim 44, wherein the dealer characteristic includes at least one of a service tool identifier, a service representative identifier, a dealer identifier, and a cross reference identifier of the dealer and the customer.

47. A method, as set forth in claim 46, wherein the machine characteristic includes at least one of a software option identifier, a processor identifier, and a configuration identifier.

48. A method, as set forth in claim 44, wherein the authorization further includes authorizing the request in response to a machine characteristic, a dealer characteristic, and a user characteristic.

49. A method of enabling a software option located on a remote machine, comprising:

establishing a machine specific configuration;

generating a request to enable the software option in response to the machine specific configuration, the request being authorized at a remote location;

delivering an enabling signal, from the remote location, to an intermediary in response to the authorization;

verifying the enabling signal by the intermediary; and receiving the enabling signal, from the intermediary, at the remote machine in response to the verification.

50. A method of enabling a software option located on a first machine having a machine function associated with the software option, comprising:

establishing a need for the software option on the first machine, the software option associated with the machine function of the first machine;

delivering a request to enable the software option on the first machine to a second machine;

disabling the software option on the second machine in response to the request;

generating an enabling signal in response to the disablement; and enabling the software option on the first machine in response to the enabling signal.

51. A system configured to enable a software option located on a remote machine having a machine function associated with the software option, comprising:

a controller located on the remote machine, the controller being configured to generate a request to enable the software option associated with the machine function of the remote machine;

a remote facility configured to receive the request, authorize the request and generate a first enabling signal; and an intermediary configured to receive the first enabling signal from the remote facility, authenticate the first enabling signal, and responsively deliver a second enabling signal to the remote machine in response to the first enabling signal, the second enabling signal configured to enable the software option.

* * * * *